United States Patent [19]

Drysdale

[11] Patent Number: 5,475,069
[45] Date of Patent: Dec. 12, 1995

[54] POLYMERIZATION OF VINYL ETHERS

[75] Inventor: Neville E. Drysdale, Newark, Del.

[73] Assignee: E. I. Du Pont de Nemours and Company, Wilmington, Del.

[21] Appl. No.: 331,764

[22] Filed: Oct. 31, 1994

[51] Int. Cl.$^6$ .................................................. C08F 2/00
[52] U.S. Cl. ........................................ 526/192; 526/332
[58] Field of Search .................................. 526/225, 192, 526/332

[56] References Cited

U.S. PATENT DOCUMENTS

| | | | |
|---|---|---|---|
| 3,842,019 | 10/1974 | Kropp | 526/225 |
| 5,028,667 | 7/1991 | McLain et al. | |
| 5,095,098 | 3/1992 | McLain et al. | |
| 5,235,031 | 8/1993 | Drysdale et al. | |

FOREIGN PATENT DOCUMENTS 0037341  10/1981  European Pat. Off. ............... 526/225

OTHER PUBLICATIONS

Cho, C. G. et al., "Initiation of Vinyl Ether Polymerization by Trimethylsilyl Triflate, Dimethyl Sulfide, and Adventitous Water", *Macromolecules*, 25, 2081–2085 (1992).

Cho, C. G. et al, "Cationic Polymerization of Isobutyl Vinyl Ether: Livingness Enhancement by Dialkyl Sulfides", *Macromolecules*, 23, 1918–1923 (1990).

U.S. Ser. No. 08/283,108 filed Jul. 29, 1994.

*Primary Examiner*—Joseph L. Schofer
*Assistant Examiner*—N. Sarofin

[57] ABSTRACT

Process for the polymerization of selected vinyl ethers catalyzed by yttrium or rare earth metal perfluoroalkylsulfonates. A preferred perfluoroalkylsulfonate anion is triflate (trifluoromethanesulfonate). The resulting polymers are useful as tackifiers in adhesives as well as in other uses (e.g., plasticizers, viscosity modifiers).

13 Claims, No Drawings

POLYMERIZATION OF VINYL ETHERS

FIELD OF THE INVENTION

The present invention relates to a process for the polymerization of vinyl ethers catalyzed by rare earth metal or yttrium perfluoroalkylsulfonates. In particular, the present invention relates to a process for the polymerization of selected vinyl ethers catalyzed by trivalent rare earth metal or yttrium perfluoroalkylsulfonates.

BACKGROUND OF THE INVENTION

Polyvinyl ethers are common articles of commerce, being employed in a variety of end-uses. For instance, some polyvinyl ethers are tacky and so they are used in adhesives. Other uses include plasticizers, surgical casts, viscosity modifiers, and fuel pour point depressants.

Vinyl ethers may be polymerized by a variety of methods, including being catalyzed by Lewis and Bronsted acids; see for example, C. G. Cho, et al., Macromolecules, vol. 23, p. 1918–1923 (1990).

It has been reported that trialkylsilyl triflates catalyze the polymerization of vinyl ethers, but this has been shown to be due to triflic acid that is formed by hydrolysis of the silyl triflate, see, for example, C. G. Cho, et al., Macromolecules, vol. 25, p. 2018–2085 (1992). No mention is made of any other triflates which catalyze the polymerization of vinyl ethers.

SUMMARY OF THE INVENTION

The present invention provides a process for the polymerization of vinyl ethers comprising, contacting a yttrium or rare earth metal perfluoroalkylsulfonate with a vinyl ether of the formula $CH_2$=$CHOR^1$ wherein $R^1$ is hydrocarbyl or substituted hydrocarbyl, provided that:

said yttrium or rare earth metal is trivalent;

$R^1$ has no more than one halogen atom alpha or beta to a vinyl ether oxygen atom; and said vinyl ether is in the liquid phase.

DETAILED DESCRIPTION OF THE PREFERRED EMBODIMENTS

Vinyl ethers useful as monomers in the present invention include those in which an unsubstituted vinyl group, $CH_2$=$CH$—, is present. The other "part" of the ether is the group $R^1$. It is preferred that $R^1$ have from 1 to 30 carbon atoms, preferably 1 to 8 carbon atoms, and more preferably 1 to 4 carbon atoms. It is also preferred that $R^1$ be alkyl or substituted alkyl, particularly n-alkyl.

The term "hydrocarbyl" as used herein means a monovalent radical containing only carbon and hydrogen. The term "substituted hydrocarbyl" as used herein means a monovalent radical substituted with one or more substitutents that are inert in the polymerization. The term "inert in the polymerization" as used herein means that the substituents themselves do not react during the polymerization, or interfere with the polymerization. Suitable substitutents include, but are not limited to, ether (between carbon atoms of the hydrocarbyl group), keto, ester, halo, thioether, amide, urethane, urea, imide, sulfone, and hydrocarbon based "functional groups" such as olefins, aromatic rings and acetylenic bonds.

The alpha and beta carbon atoms of the group $R^1$ should not together have more than one halogen atom bound to them. For instance, if the group $R^1$ (with ether oxygen atom) is partially written as —$CX_2CX_2O$—, then only one of the "X's" can be a halogen atom.

The polymerization catalysts disclosed herein are compounds of yttrium or rare earth metals. The term "rare earth metal" as used herein means one of lanthanum, cerium, neodymium, promethium, samarium, europium, gadolinium, praeseodymium, terbium, dysprosium, holmium, erbium, thulium, ytterbium, or lutetium. Preferred metals (as their perfluoroalkylsulfonate salts) used in the polymerization include yttrium, ytterbium, dysprosium, samarium and erbium. Moreover, a preferred "metal" is "mischmetall" (also called "didymium") which is a mixture of rare earth metals in approximate proportions in which they are found in the ore.

The term "a yttrium or rare earth metal perfluoroalkylsulfonate" as used herein, means a compound of any of the above-identified metals that contains at least one perfluoroalkylsulfonate anion (ionically) bound or coordinated to the metal. Thus, a perfluoroalkylsulfonate anion may have the formula $R^5SO_3$—, wherein $R^5$ is perfluoroalkyl, preferably containing 1 to 30 carbon atoms, more preferably containing 1 carbon atom, and the yttrium or rare earth metal perfluoroalkylsulfonate may contain 1, 2 or 3 of these anions. It is preferred that it contain 3 of these anions (therefore containing no other anions). When $R^5$ contains one carbon atom it is called trifluoromethanesulfonate, also referred to as "triflate" herein. The perfluoroalkylsulfonate anion may also be part of a polymer, so long as the alpha and beta carbon atoms are bound to at least 4 fluorine atoms, for example as in —$CF_2CF_2SO_3$—.

If the metal perfluoroalkylsulfonate has other anions present, besides perfluoroalkylsulfonate, they should be relatively inert (not chemically reactive in the polymerization). Suitable anions include acetylacetonate, cyclopentadienide, pentamethylcyclopentadienide, t-butylacetylacetonate and halide. It is preferred that all of the anions be perfluoroalkylsulfonate. The metal perfluoroalkylsulfonate may also optionally contain neutral ligands, which are usually coordinated with the metal cation. Such ligands include water and ethers, such as dimethyl ether.

When the polymerization process is run, the vinyl ether is present in the liquid phase. The catalyst may also be present in the liquid phase, and it is preferred that it is. However, it is acceptable that the catalyst be present in another phase as long as it is in contact with the vinyl ether. For instance, perfluoroalkylsulfonate anions may be a salt of a crosslinked polymer that contains perfluoroalkylsulfonate anions. Such polymers (in the acid form) are commercially available as "Nafion", from E. I. du Pont de Nemours and Company, Wilmington, Del., USA. The perfluoroalkylsulfonate may also be adsorbed or chemically bound to a solid support such as alumina or silica (gel).

The polymerization process may be carried out at about $-80°$ C. to about $120°$ C., preferably about $-30°$ C. to about $80°$ C. The polymerization may be carried out neat (without solvent) or in the presence of a solvent. It is preferred that a solvent be present. Suitable solvents include aromatic hydrocarbons, such as toluene, ethers, such as ethyl ether, and chlorinated hydrocarbons, such as methylene chloride. Typical reaction times are about 15 min to about 2 hr, but this may be shorter or longer. Pressure is not critical, atmospheric pressure or autogenous pressure (for those reactions run above the boiling point of the vinyl ether or solvent) being convenient.

It is preferred that the starting materials be reasonably dry (water free) and it is convenient to run the polymerization under an inert gas, such as nitrogen. The polymerization may be terminated by the addition of a protic material such as water. Agitation, particularly when the catalyst is not in the same phase as the vinyl ether, is desirable.

The ratio of monomer to catalyst is not critical, and typical ratios are disclosed in the Examples. A useful range is a ratio of monomer (in mL) to catalyst (in g) of about 5 to about 1000, preferably about 10 to about 250.

EXAMPLES

In the following non-limiting Examples, the following abbreviations are used:
GPC—gel permeation chromatography
Mn—number average molecular weight
Mw—weight average molecular weight
PD—polydispersity, Mw/Mn
PMMA—poly(methyl methacrylate)
PS—polystyrene
RB—round-bottomed
STD—standard
THF—tetrahydrofuran

Example 1

Polymerization of Isobutyl Vinyl Ether with Yttrium Triflate

In a dry box, yttrium triflate (0.50 g) was added to each of three separate oven dried 100 mL RB flasks equipped with stirring bars. The flasks were sealed with rubber septa and removed from the dry box. After the attachment of nitrogen bleeds, hexane (50.0 mL) was added to each flask. Isobutyl vinyl ether (10.0 ml) was then added to each flask. After 30, 45 and 60 minutes, a polymerization was terminated via the addition of water and hexane. The resulting organic phases were separated, concentrated at reduced pressure and then dried under vacuum. Polymer yields and GPC analyses are as follows:

| Polym. Time (min) | Polymer Yield (g) | Mn (PMMA STD) | Mw (PMMA STD) | PD |
|---|---|---|---|---|
| 30 | 7.42 | 23800 | 166000 | 7.00 |
| 45 | 7.63 | 40700 | 162000 | 3.99 |
| 60 | 7.55 | 46800 | 208000 | 4.46 |

Example 2

Polymerization of Isobutyl Vinyl Ether with Ytterbium Triflate in the Presence of 2,6-Di-tert-butyl-4-methylpyridine In a dry box, ytterbium triflate (0.5 g, 0.8 mM) and 2,6-di-tert-butyl-4-methylpyridine (0.584 g, 2.85 mM) were added to an oven dried 100 mL RB flask equipped with a stirring bar. The flask was sealed with rubber septum and then removed from the dry box, a nitrogen bleed was attached and tetrahydropyran (50.0 mL) added, followed by isobutyl vinyl ether. After 5 hours the polymerization was terminated via the addition of water, ether, and THF. The resulting organic phase was separated, concentrated at reduced pressure and then dried under vacuum. Polymer yield: 4.15 g. GPC analysis: Mn=7820, Mw=13100, PD=1.67 (PS STD).

Example 3

Polymerization of Isobutyl Vinyl Ether with Lanthanum Triflate

In a dry box, lanthanum triflate (0.5 g) was added to an oven dried 100 mL RB flask equipped with a stirring bar. The flask was sealed with rubber septum and then removed from the dry box, a nitrogen bleed was attached and tetrahydropyran (50.0 mL) was added, followed by isobutyl vinyl ether. After 19 hours the polymerization was terminated via the addition of water, ether, and tetrahydropyran. The resulting organic phase was separated, concentrated at reduced pressure and then dried under vacuum. Polymer yield: 0.93 g.

Example 4

Polymerization of Isobutyl Vinyl Ether with Dysprosium Triflate

In a dry box, dysprosium triflate (0.5 g) was added to an oven dried 100 mL RB flask equipped with a stirring bar. The flask was sealed with rubber septum and then removed from the dry box, a nitrogen bleed was attached and tetrahydropyran (50.0 mL) was added, followed by isobutyl vinyl ether. After 4 hours the polymerization was terminated via the addition of water, ether, and tetrahydropyran. The resulting organic phase was separated, concentrated at reduced pressure and then dried under vacuum. Polymer yield: 6.25 g. GPC analysis: Mn=3360, Mw=10900, PD=3.25 (PMMA STD).

Example 5

Polymerization of Isobutyl Vinyl Ether with Erbium Triflate

In a dry box, erbium triflate (0.504 g) was added to an oven dried 100 mL RB flask equipped with a stirring bar. The flask was sealed with rubber septum and then removed from the dry box, a nitrogen bleed was attached and hexane (50.0 mL) was added, followed by isobutyl vinyl ether. After 5 hours the polymerization was terminated via the addition of water and hexane. The resulting organic phase was separated, concentrated at reduced pressure and then dried under vacuum. Polymer yield: 4.24 g. GPC analysis: Mn=37700, Mw=413000, PD=10.95 (PMMA STD).

Example 6

Polymerization of Isobutyl Vinyl Ether with Yttrium Triflate (20%) supported on Silica In a dry box, yttrium triflate (20%) supported on silica (2.0 g) was added to an oven dried 100 mL RB flask equipped with a stirring bar. The flask was sealed with rubber septum and then removed from the dry box, a nitrogen bleed was attached and tetrahydropyran (50.0 mL) was added, then placed in an ice bath maintained at 0° C., isobutyl vinyl ether (10 mL) was then added. After 2 hours the polymerized mixture was filtered. The filtrate was then washed with water, tetrahydropyran and ether. The resulting organic phase was again washed with water, separated then concentrated at reduced pressure and then dried under vacuum. Polymer yield: 3.96 g.

Example 7

Polymerization of Isobutyl Vinyl Ether with Ytterbium Triflate

In a dry box, ytterbium triflate (0.5 g) was added to an oven dried 100 mL RB flask equipped with a stirring bar. The flask was sealed with rubber septum and then removed from the dry box, a nitrogen bleed was attached and tetrahydropyran (50.0 mL) was added. The flask was then placed in an ice bath and isobutyl vinyl ether (10 mL) was added. After 2 hours the polymerization was terminated via the addition of water, THF and ether. The resulting separated organic phase was washed with additional with water. The water washes were combined, concentrated at reduced pressure and then dried under vacuum at 200° C. overnight, affording 0.56 g of recovered catalyst. The organic phase was also concentrated at reduced pressure and then dried under vacuum to give 9.26 g of wet polymer.

To the recovered catalyst under nitrogen was added tetrahydropyran (50 mL), the resulting solution was cooled to 0° C. with an ice bath, after which isobutyl vinyl ether (10 mL) was added. After 2 hours the polymerization was terminated via the addition of water, ether and THF. The separated organic phase was washed with additional water. The water washes were combined, concentrated at reduced pressure and then dried under vacuum at 200° C. to give 0.55 g of recovered catalyst. The organic phase was concentrated at reduced pressure and then dried under vacuum affording 9.63 g of wet polymer.

To the above recovered catalyst under nitrogen was added tetrahydropyran (50 mL). The resulting solution was cooled to 0° C. via an ice bath, then isobutyl vinyl ether (10 mL) added. After 3 hours the polymerization was terminated via the addition of water, THF and ether. The separated organic phase was washed additionally with water, concentrtaed at reduced pressure and then dried under vacuum, providing 8.76 g of wet polymer.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than the foregoing specification, as indicating the scope of the invention.

What is claimed is:

1. A process for the polymerization of vinyl ethers, comprising, contacting a yttrium or rare earth metal perfluoroalkylsulfonate with a vinyl ether of the formula $CH_2=CHOR^1$ wherein $R^1$ is hydrocarbyl or substituted hydrocarbyl, provided that:

said yttrium or rare earth metal is trivalent;

$R^1$ has no more than one halogen atom alpha or beta to a vinyl ether oxygen atom; and said vinyl ether is in the liquid phase.

2. The process as recited in claim 1 wherein $R^1$ is alkyl or substituted alkyl.

3. The process as recited in claim 2 wherein $R^1$ is alkyl containing 1 to 30 carbon atoms.

4. The process as recited in claim 3 wherein $R^1$ is n-alkyl.

5. The process as recited in claim 1 wherein $R^1$ is alkyl containing 1 to 8 carbon atoms.

6. The process as recited in claim 1 wherein the polymerization is carried out at a temperature of from about −80° C. to about 120° C.

7. The process as recited in claim 6 wherein said temperature is from about −30° C. to about 80° C.

8. The process as recited in claim 1 wherein the metal of said rare earth metal perfluoroalkylsulfonate is ytterbium, dysprosium, samarium or erbium.

9. The process as recited in claims 1 or 8 wherein said yttrium or rare earth metal perfluoroalkylsulfonate is a triflate.

10. The process as recited in claim 1 wherein said yttrium or rare earth metal perfluoroalkylsulfonate is present in the liquid phase.

11. The process as recited in claim 1 wherein a solvent is also present.

12. The process as recited in claim 1 wherein said yttrium or rare earth metal perfluoroalkylsulfonate contains only perfluoroalkylsulfonate anions.

13. The process as recited in claim 9 wherein said yttrium or rare earth metal perfluoroalkylsulfonate contains only perfluoroalkylsulfonate anions.

* * * * *